Nov. 12, 1940.          H. E. KRATZER          2,221,052
                            BAKEPAN
                       Filed Jan. 6, 1939

Inventor
Herman E. Kratzer

By Strauch & Hoffman
           Attorneys

Patented Nov. 12, 1940

2,221,052

UNITED STATES PATENT OFFICE 2,221,052

BAKEPAN

Herman E. Kratzer, Salt Lake City, Utah

Application January 6, 1939, Serial No. 249,665

4 Claims. (Cl. 53—6)

The present invention relates to means and methods for baking, and more particularly to bakepans for and methods of baking buns known commercially as hamburger or barbecue buns.

Buns of these and similar types have been manufactured on a commercial scale for many years to supply the needs of sandwich shops and roadside luncheon establishments. The present commercial buns, however, have not been entirely satisfactory to the bakers or consumers because of their lack of uniform size, texture, color and tenderness.

The absence of these desired characteristics in present day buns is traceable principally to three factors; namely, (1) the lack of satisfactory baking pans; (2) the attempts of bakers to obtain uniform bun sizes by "punching down" the "proofed" dough to fit the common shallow molds now used and requiring a second "proofing"; and (3) the exposure of the bun dough to the "open oven heat."

In overcoming the disadvantages of the prior structures and methods, an object of the present invention is to provide novel means and methods for baking buns of uniform size and shape and of a uniform tender crust and color.

A further object of this invention resides in the provisions of novel means and methods for baking whereby the second "proofing" of the dough, with its detrimental effect on the bun, is eliminated.

A further object of this invention resides in the provision of a novel baking pan having relatively deep bun molding pockets and a cover designed to cooperate with the pan and substantially completely isolate the bun dough from the "open oven heat."

A still further object of this invention is to provide a novel cover for a baking pan with relatively small apertures cooperating with pockets in the pan for permitting the air and gases generated from baking to escape.

Another object of this invention is to provide a novel baking pan having a cover with shallow depressions designed to cooperate with the molding pockets and provide a so-called trap directly over the pockets for retaining relatively cool air therein to prevent pre-baking of the top of the dough so that the bun will not bake until the pan and cover have reached a temperature sufficient to bake the bun on all surfaces simultaneously.

Another object of this invention is to provide a novel covered baking pan with depressions in the cover preferably fitted to the molding pockets in the pan so that the depressions loosely fit in the pockets and engage the top of the dough to prevent excessive upward expansion thereof to force the dough to expand radially and completely fill the molding pocket, the cover preferably being provided with means to prevent the upward expansion of the dough from raising the cover and being arranged so that it can be conveniently removed without damage to the bun.

Further objects and advantages of this invention will appear as the description is read in conjunction with the appended claims and attached drawing wherein:

Figure 1:
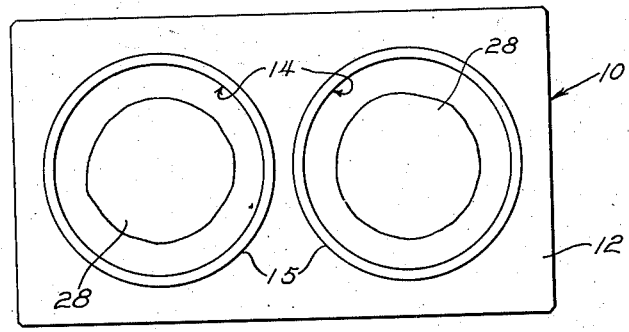
Figure 1 is a top plan of a pan made in accordance with the present invention.

With continued reference to the drawing wherein like reference numerals are used throughout the several figures to indicate the same parts, the numerals 10 and 11 indicate generally the pan and cover, respectively, of a baking pan embodying the present invention.

Pan 10 comprises a flat web-like supporting plate 12 having apertures 13 therein for receiving molding pockets or cups 14. Plate 12 may contain any desired number of pockets 14, two pockets being shown for convenience of illustration. Pockets 14 may be secured to plate 12 in any desired manner such as by spinning the edges of the plate and pockets together as shown at 15 or the plate and the pockets may be made integral. The outer edges of plate 12 are preferably bent over as shown at 12a for reenforcing the pan.

Pockets 14 may be of any desired shape or size but preferably are round as shown when hamburger buns are to be baked and of sufficient size even when covered to accommodate a baked two ounce bun, measuring approximately three and one-half (3½) inches in diameter and one and three-eighths (1⅜) inches in height. A bun of the size specified is generally considered to be the proper and desired size for hamburger sandwiches.

One preferred form of cover, comprises preferably a relatively flat metal sheet having a down-turned flange 17, the end 18 of which is turned up around a weighted metal strip 19. Flange 17 extends completely around pan 10 and is spaced from the edges thereof a substantial distance to insure the access of heat to all sides of the molds and for convenience in removal.

Inwardly from the edges of cover 11, the surface of the cover is depressed as at 21 to provide a well or air pocket 22 overlying each molding pocket 14 and extending part way therein. Depressions 21 are approximately one-quarter (¼) inch in depth and are of a diameter to loosely fit in pockets 14. Depressions 21, adjacent the periphery of the substantially horizontal central portion 23, are preferably provided with a circular series of small apertures 24 designed to permit the escape of air and gases, developed from the baking, from pockets 14 during baking. The spacing of flange 17 from pan 10 is provided to permit the proper cooperation of depressions 21 and pockets 14, and to prevent binding of the pan and cover even if one or the other should become distorted by repeated use and subjection to heat.

It will also be noted that by reason of the novel design of the cover and the pan, the two together do not take up any more room in an oven than the pan alone. Furthermore, the pan and cover when combined form a unit that can readily be handled and moved in and out of an oven. The unit is also readily capable of use in travelling ovens.

Figure 2:
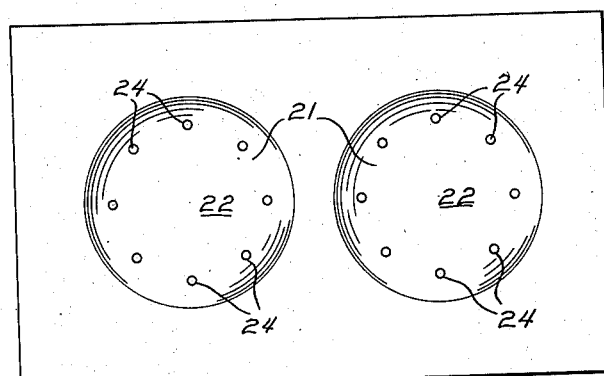
Figure 2 is a top plan of the cover of the present invention.
Figure 3:
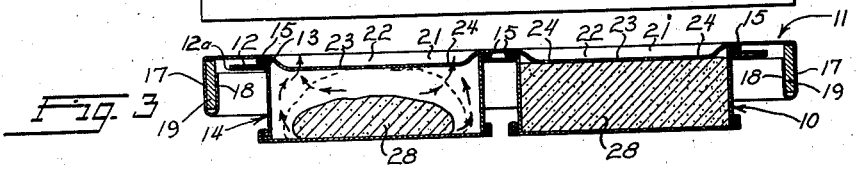
Figure 3 is a transverse section through an assembled pan with the cover in place, showing how the dough of the bun expands into engagement with the cover and then expands radially to fill the molding pocket.

Buns are preferably made and cooked in the following manner when using a pan made according to the present invention:

First a bun dough is made up in the usual manner, with the exception that the shortening and other ingredients can be decreased to approximately the richness of loaf bread dough, thereby effecting a considerable saving. The dough made in this manner is then "proofed" in well known manner. After sufficient "proofing", portions of the dough sufficient to make a two ounce bun are placed in pockets 14 as shown in Figure 1 and at the left of Figure 2 at 28 and cover 11 is placed on pan 10 with depressions 21 loosely fitting in pockets 14 as shown at the left of Figure 2.

The pan is immediately placed in an oven heated to the proper temperature. The heat of the oven causes the dough to expand or rise until it engages flat surface 23 of cover 11 as shown in dotted lines at the left of Figure 2. At this time further upward expansion of the dough is resisted by weighted cover 11 and the dough is forced to expand radially until pocket 14 is completely filled as shown at the right of Figure 2. During this expansion, the air in pockets 14 and the discharged gases pass from pockets 14 to the oven through apertures 24 as indicated by the arrows.

During this stage the temperature in pockets 14 is not sufficiently high to start baking of the bun since the oven heat has not penetrated through the metal of the pan and cover. As a consequence, the dough will expand and completely fill the mold before any actual baking takes place. This effect is further enhanced by well or air trap 22 in which relatively cool air is retained because of the fact that the hot oven air circulates around and over the surfaces of the pan because of its inherent tendency to rise and it will not flow down into depressions 21 and through apertures 24 into pockets 14.

As soon as the pan and cover become thoroughly heated bun 29 begins to bake and the air in trap 22 becomes warm and rises. The entire metal surface in contact with the dough accordingly reaches and remains at the same temperature and evenly cooks the bun. It will be noted that the "open oven heat" at no time is in contact with any portion of bun 29 or pockets 14. As a consequence, the undesirable rapid baking of the top of the bun now usually encountered and the consequent drying of the bun and toughening of the top crust is eliminated. When buns 29 have been cooked for a sufficient time, the pans are removed from the oven and buns 29 are removed from the pan to cool or be served hot.

Figure 5:
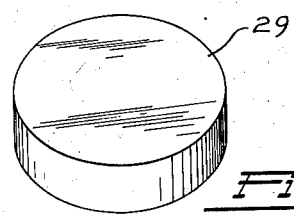
Figure 5 is a perspective of a bun made in accordance with the present invention.

As a result of the single "proofing" of the dough and elimination of the "punching down" now generally followed by bakers, the finished bun has an unusually fine grain. Furthermore, by use of the pan of the present invention the buns 29 will be of substantially uniform size and shape as shown in Figure 5. The bun will not be dry, and the crust will be uniformly tender and evenly baked and brown.

Figure 4:
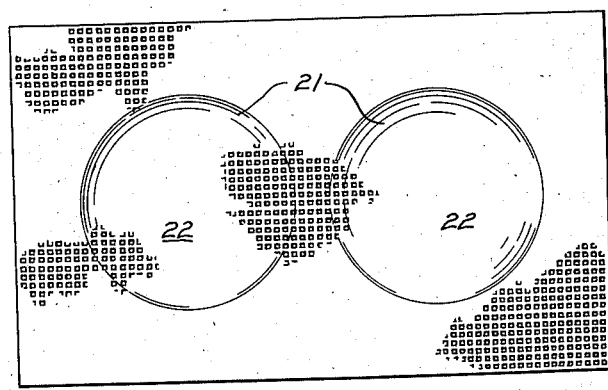
Figure 4 is a top plan view of a modified form of cover.

Figure 4 illustrates a modified form of cover 11a. Cover 11a is formed from a metal mesh material and has a weighted flange 17 (not shown) exactly like that of cover 11. In this form of the invention, depressions 21 are formed exactly like the depressions 21 of cover 11, except that the apertures 24 are omitted. The function of apertures 24 is adequately performed by the holes provided by the mesh cover and are consequently unnecessary.

It is to be noted that the present invention is characterized by a number of advantages not found in the prior art.

By reason of the novel pan and cover construction, the cover readily covers two individual pockets yet can be easily removed by a straight vertical movement without damaging the buns. The pan with its cover on takes up no more room than an uncovered pan thereby permitting full use of the effective oven space. By reason of the individual molding pockets being of a size to accommodate the baked bun, the correct size and shape of the final product is always assured.

An improved product is obtained because the necessity for the prior "punching down" step is removed. Not only is this an economy but is of advantage in avoiding the break-down of the texture of the bun which always follows "punching down." This invention permits further material economies in the saving of ingredients particularly shortening and has been found to cut the baking time substantially in half, thus doubling the capacity of an oven. Moreover the final product is definitely improved in all respects when compared with prior products.

While this invention has been specifivally described in connection with the baking of hamburger or barbecue buns, it is to be understood that it is not so limited and has ready application in the baking of other kinds of bakery products.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A baking pan for hamburger buns or the like comprising a pan having a plurality of open topped bun molds of predetermined size, a cover co-extensive with the top of said pan, a plurality of downwardly extending shallow depressions in said cover equal in number to said molds and complementing in relation thereto for loosely fitting into said molds and resisting excessive upward expansion of the dough placed in said molds, the depressed portions of said cover having a plurality of relatively small apertures therein to allow the escape of air and gases from the yeast and other ingredients from the molds as the bun dough expands and cooks, and a peripheral, downwardly extending, weighted flange on said cover, said pan cooperating with said cover to prevent direct contact between the open oven heat and the dough in said molds and said flange preventing the raising of said cover as the dough expands against said depressions.

2. The pan defined in claim 1 wherein said depressions provide a trap on the top surface of said cover over each of said molds to retain a layer of relatively cool air over the top of the bun dough until said pan is thoroughly heated to prevent pre-cooking of the top of the bun.

3. A cover for a bun baking or like baking pan having individual pockets comprising a substantially flat metal member having spaced depressions in its upper surface, a downwardly extending weighted flange along its periphery, and means to permit the passage of the air and gases from the pan to the oven.

4. A baking pan for hamburger buns or the like comprising a pan with a least one molding pocket of predetermined size and shape, a cover for said pan substantially closing the open face of said molding pocket, said cover being formed with a shallow depression designed to extend part way into said molding pocket and arrest the normal rising of the dough, said depression also serving to provide a trap directly above said molding pocket for retaining a quantity of relatively cool air above said pocket thereby retarding the cooking of the top of the bun until said pocket and cover are sufficiently hot to bake the bottom, sides and top of the bun simultaneously without direct contact of the bun dough with the open oven heat.

HERMAN E. KRATZER.